March 17, 1964  F. C. PALLER  3,125,177
BATTERY CLAMPING DEVICE
Filed March 6, 1961
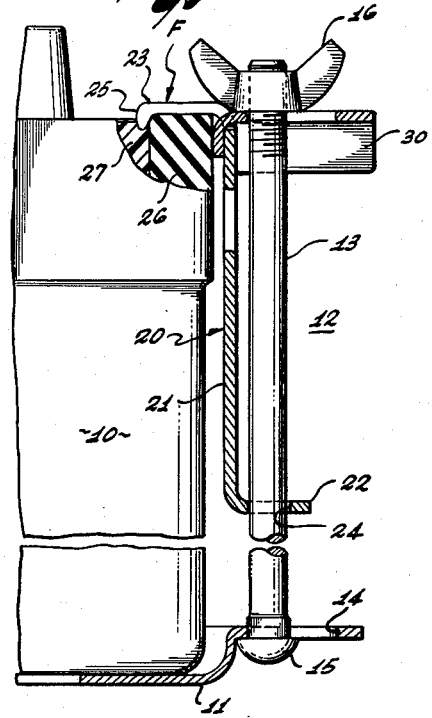
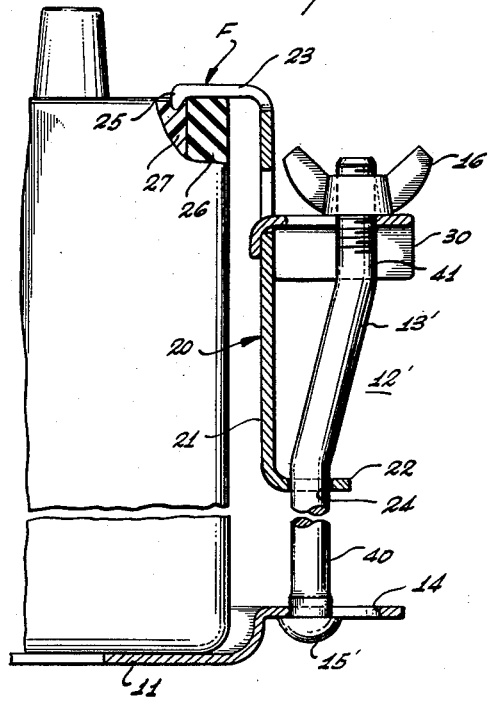
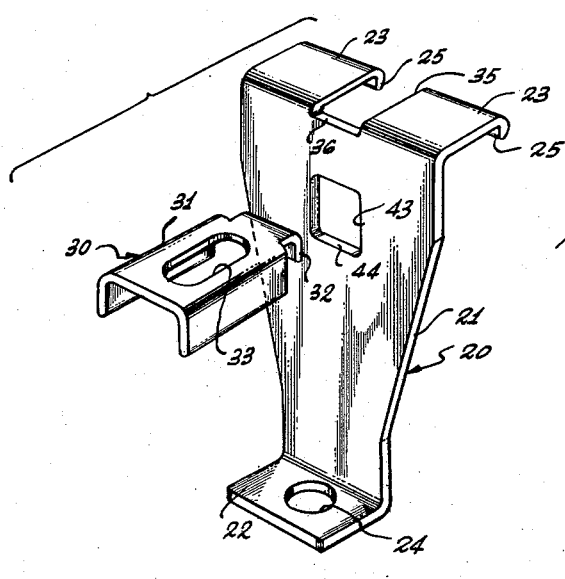
INVENTOR.
FREDERICK C. PALLER
BY Fulwider Mattingly Huntley
Attorneys United States Patent Office 3,125,177
Patented Mar. 17, 1964

3,125,177
BATTERY CLAMPING DEVICE
Frederick C. Paller, Northridge, Calif., assignor to Superior Industries, Inc., North Hollywood, Calif., a corporation of California
Filed Mar. 6, 1961, Ser. No. 93,486
1 Claim. (Cl. 180—68.5)

This invention relates to clamps for releasably securing one structure to another, and more particularly to improved hold-down clamps for automobile storage batteries and the like.

A well known arrangement for securing an automobile storage battery in place is one that employs a horizontal shelf on which to set the battery, and wherein a number of bolts extend upwardly from the shelf and are spaced about the battery. The upper end of each bolt is threaded to receive a wing nut, and a clamp arm slidable on each bolt is adapted to have one end thereof placed over the upper edge portion of the battery. By turning the wing nut against the arm, the outer end of the arm is brought to bear firmly against the top of the battery casing. With a number of clamps engaging the casing in this manner, the battery is held firmly in place.

As is well known, certain battery hold-down clamp structures employ bolts that are long enough to extend above the top of the battery when it is set in place, and others employ bolts that are shorter and do not extend to the top of the battery. For the arrangements employing the longer bolts, the clamping arm is essentially a straight bar having an opening at one end through which the bolt passes. In those arrangements employing the shorter bolts, the clamp element is one that is generally Z-shaped, wherein the upper end of the bolt passes through one leg and the other leg extends over the top of the battery casing.

Regardless of which clamp arrangement is employed, the end of the arm that engages the battery casing is effectively clamped over and around the edge of the battery casing, i.e., it has an inturned foot portion that is seated in the pitch material. On turning the wing nut against it, the portion of the arm engaged by the nut is forced downwardly along the bolt, whereupon the entire arm turns about the clamped edge of the battery casing and exerts a lateral pull on the casing.

As will be apparent, a plurality of clamps arranged as above described establish a number of points of stress on the battery casing. All of these stresses ultimately weaken the bond between the pitch material and the inner wall of the casing, so that the acid material used in the electrolyte may readily escape. As so often happens, not only does the loss of the electrolyte shorten the life of the battery, but adjacent structures, such as battery cables, clamps and the like, are damaged by the electrolyte and must be replaced.

It is an object of my invention to provide an improved clamping device for storage batteries and the like that overcomes the above and other disadvantages of the prior art.

Another object of my invention is to provide a clamping element of one shape and size that is suitable for use in battery hold-down clamp assemblies that employ bolts of different lengths.

A further object of my invention is to provide a battery clamp structure that comprises a minimum number of component parts of simple design and rugged construction, and which in use is effective to exert at least as great a vertical clamping force as is possible with prior art clamping devices, but which does not exert lateral stress on a battery casing as do prior art clamps.

The above and other objects and advantages of my invention will become apparent from the accompanying drawing of an illustrative embodiment thereof, in which:

FIGURE 1 is a fragmentary side elevation view, partly in section, of a storage battery with a clamp of my invention in clamping position;

FIGURE 2 is a fragmentary side elevation view of a storage battery, similar to FIGURE 1, wherein the tie-down bolt adjacent the battery is considerably shorter than the bolt of FIGURE 1, showing the adjustable load-bearing arm in a lower position to permit it to be engaged by the wing nut on the bolt; and FIGURE 3 is an exploded view of the parts of my unique clamp device, showing the vertically spaced opening and slot in the main body, and showing the load-bearing arm shaped to permit it to be releasably attached to ledges provided by such slot and opening.

Referring to FIGURE 1, an automobile storage battery 10 is shown placed on a shelf 11, and held firmly in place on the shelf 11 by a clamp assembly 12. The clamp assembly 12 includes a conventional tie-down pin or bolt 13 that extends through an opening 14 in the shelf 11 and alongside the battery 10. The bolt 13 is held against vertical movement relative to the shelf 11, as by means of a head 15 thereon that is located on the underside of the shelf, and which is too large to pass through the opening 14. At its upper end, which extends above the top of the battery 10, the bolt 13 is threaded to receive a nut element, shown as a wing nut 16.

For clamping the battery 10 in place on the shelf 11, I provide unique clamp apparatus on the bolt 13 for engaging the top of the battery casing, and which is brought to bear firmly against the top of the casing by turning the wing nut 16 against a portion thereof. To understand the clamp apparatus of my invention, reference will be made to FIGURE 3 along with FIGURE 1. As shown, the clamp apparatus 20 includes a flat plate that is shaped at its ends so as to be substantially Z-shaped. Thus, the plate has a flat body section 21 with horizontal shelves 22, 23 extending in opposite directions from its ends. The flat body section 21 is vertically disposed when in use. The lower shelf 22 is provided with an opening 24 to receive the shank of a bolt 13, and the upper shelf 23, which is adapted to be placed against the top of the battery casing terminates in a foot portion 25 that is adapted to be locked against the inner edge of the battery casing.

FIGURE 1 shows the upper shelf 23 in place where it extends over and against the upper edge of the casing, indicated at 26. The foot portion 25 on the shelf 23 is in the normal clamping position wherein it has been forced into the pitch material, indicated at 27, that fills the top of the casing.

When the upper shelf 23 is in clamping position, it exerts only a vertical force against the upper edge of the casing 26. In this manner, and contrary to prior art clamping devices, since no outward pull is exerted on the top of the casing 26, the clamping device of my invention avoids the dangers, inherent in the use of prior art clamps, of breaking the bond between the casing 26 and the pitch material 27. This unique result is obtained by the provision in my clamp apparatus of a load-bearing arm 30 that extends from the upper end of the vertical section 21 and in the same direction as the lower shelf 22. The arm 30 is positioned to be engaged by the wing nut 16. Accordingly, when the wing nut 16 is brought to bear against the arm 30, the entire clamp apparatus is forced vertically downward, thereby causing the upper shelf 23 to exert a vertical force only, as indicated by the arrow F, against the top edge of the casing 26.

In order to accomplish the desired result, the parts of my unique bracket 20 are made of rigid, unbendable material, e.g., stamped metal. Considering the structure thus far described, it will be seen that when the wing nut 16 is brought to bear against the arm 30, the arm 30 exerts a downward thrust on the vertical section 21. The opening 24 in the lower shelf 22 is just large enough to slidably receive the shank of the bolt 13. Thus, it will be seen that the vertical section 21 cannot undergo any lateral movement relative to the bolt 13 when a downward force is brought to bear against the vertical section 21. Since the vertical section 21 cannot undergo lateral movement, and since it cannot bend, the upper shelf 23 can only move vertically, whereby the force against the upper edge of the casing 26 is a vertical force only.

Preferably, the load-bearing arm 30 is adapted to be releasably attached to the vertical section 21 of the clamp apparatus. For this purpose (see FIGURE 3), the arm 30 is formed with a short channel-shaped body 31 wherein the web portion at one end has an extension terminating in a short rib 32 that extends in the same direction as the side walls of the body 31. The web portion of the body 31 is provided with an elongated opening 33 to receive the upper end of the bolt 13.

To accommodate the arm 30, the upper shelf 23 has a central slot 35 extending therethrough. The slot 35 extends into the upper portion of the vertical section 21, whereby to provide a horizontal ledge 36. The distance between the end of the body 31 and the confronting surface of the rib 32 is substantially the thickness of the vertical section 21. Accordingly, the arm 30 is hooked in place by hooking the rib 32 across the ledge 36. In this latter connection, the slot 35 is sufficiently wide to permit the arm 30 to be hooked to the vertical section 21 with relative ease. Furthermore, the shelf 23 is sufficiently long that the spaced halves thereof have the desired rigidity.

FIGURE 2 illustrates how my improved clamp apparatus is adapted for clamping the battery 10 in place by the use of bolts that do not extend to the top of the casing 26. Such a bolt 13' is shown to be the type having laterally displaced vertical sections 40, 41, so that the upper vertical section is spaced far enough from the battery to permit the wing nut 16 to be turned. As shown, the vertical section 21 of the clamp apparatus is sufficiently long so that the lower shelf 22 is in a plane passing through the lower vertical section 40 of the bolt 13'. Also, the elongated opening 33 in the arm 30 permits it to be placed over the end of a bolt that is spaced farther from the battery than the bolt 13 of FIGURE 1.

The arm 30 is hooked to the vertical section 21 at a lower position, so that it extends over the vertical threaded portion 41 of the bolt 13'. To this end, the vertical section is provided with a rectangular opening or window 43 that is as wide as the slot 35. There is thus provided a horizontal ledge 44 at the bottom of the opening 43 that is similar to the ledge 36, and provides a support on which to hook the arm 30.

The clamp apparatus functions in the same manner in the arrangement of FIGURE 2 as in that of FIGURE 1. Since the arm 30 and the shelf 22 are on vertical portions of the bolt 13', and the section 21 is vertical, turning the wing nut 16 against the arm causes only a vertical force to act on the section 21. Therefore, the upper shelf 23 is urged vertically downward only against the upper edge of the battery casing 26.

While I have illustrated and described a particular embodiment of my clamp apparatus, it will be apparent that various modifications can be made therein without departing from the spirit and scope of my invention. Accordingly, I do not intend that my invention be limited, except as by the appended claim.

I claim:

A battery clamping device for use with an inverted generally vertically extending clamping bolt and a nut threaded to the upper end of said bolt to secure one side of a battery upon a shelf, comprising:

a rigid, unbendable plate having a flat vertical body section and a pair of upper and lower oppositely extending horizontal legs parallel to one another and perpendicular to said body portion, said upper leg having a depending foot that engages the side of said battery to be clamped, said lower leg being formed with an opening for slidable mating engagement with the shank of said clamping bolt, said plate being formed with a plurality of vertically spaced slots providing horizontal ledges at a plurality of different vertical levels including a level spaced below said upper leg;

and a horizontal load-bearing arm formed at one end with a rib that is selectively engageable with any one of the horizontal ledges of said plate, means on said rib to engage the inner side of said plate, said arm having a vertical surface that abuts the outer side of said plate to maintain said arm horizontal when said rib is engaged with said ledges, said arm also being formed with an elongated aperture that receives the upper portion of said clamping bolt, with said nut then being tightened upon said bolt to impose a downwardly directed force against said arm that is transferred to said plate, the lower end of said plate being restrained against lateral movement away from said battery by the engagement of said bolt with the opening in the lower leg of said plate, with the upper portion of said bolt being positioned laterally away from the vertical body section of said plate when said rib is engaged with a slot spaced below said upper leg to permit unobstructed rotation of said nut.

References Cited in the file of this patent
UNITED STATES PATENTS 1,867,735    Dunzweiler    July 19, 1932
2,870,855    Hildreth    Jan. 27, 1959